United States Patent
Oh et al.

(10) Patent No.: US 12,074,324 B2
(45) Date of Patent: Aug. 27, 2024

(54) NEGATIVE ELECTRODE ACTIVE MATERIAL, NEGATIVE ELECTRODE INCLUDING THE NEGATIVE ELECTRODE ACTIVE MATERIAL, SECONDARY BATTERY INCLUDING THE NEGATIVE ELECTRODE, AND METHOD OF PREPARING THE NEGATIVE ELECTRODE ACTIVE MATERIAL

(71) Applicant: LG ENERGY SOLUTION, LTD, Seoul (KR)

(72) Inventors: Il Geun Oh, Daejeon (KR); Yong Ju Lee, Daejeon (KR); Su Min Lee, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 775 days.

(21) Appl. No.: 17/252,431

(22) PCT Filed: Oct. 18, 2019

(86) PCT No.: PCT/KR2019/013775
§ 371 (c)(1),
(2) Date: Dec. 15, 2020

(87) PCT Pub. No.: WO2020/080900
PCT Pub. Date: Apr. 23, 2020

(65) Prior Publication Data
US 2021/0257617 A1    Aug. 19, 2021

(30) Foreign Application Priority Data
Oct. 19, 2018    (KR) .................. 10-2018-0124980

(51) Int. Cl.
*H01M 4/587*    (2010.01)
*C01B 32/984*    (2017.01)
*H01M 4/02*    (2006.01)
*H01M 10/0525*    (2010.01)

(52) U.S. Cl.
CPC ........... *H01M 4/587* (2013.01); *C01B 32/984* (2017.08); *C01P 2004/61* (2013.01); *H01M 2004/021* (2013.01); *H01M 2004/027* (2013.01); *H01M 10/0525* (2013.01)

(58) Field of Classification Search
CPC ............. H01M 4/587; H01M 10/0525; H01M 2004/021; H01M 2004/027; C01B 32/984; C01P 2004/61
See application file for complete search history.

(56) References Cited

U.S. PATENT DOCUMENTS

| | | |
|---|---|---|
| 5,698,340 A | 12/1997 | Xue et al. |
| 2008/0118844 A1 | 5/2008 | Miyamoto et al. |
| 2012/0295160 A1* | 11/2012 | Miller ................ H01M 4/134 |
| | | 252/182.1 |
| 2013/0115517 A1 | 5/2013 | Kim et al. |
| 2013/0240800 A1 | 9/2013 | Watanabe et al. |
| 2014/0287315 A1 | 9/2014 | Troegel et al. |
| 2014/0374673 A1* | 12/2014 | Chan ................ H01M 4/386 |
| | | 252/521.1 |
| 2018/0083275 A1 | 3/2018 | Put et al. |
| 2019/0393497 A1* | 12/2019 | Wietelmann ........ H01M 4/1395 |

FOREIGN PATENT DOCUMENTS

| | | |
|---|---|---|
| CN | 103222091 A | 7/2013 |
| CN | 106025291 A | 10/2016 |
| JP | H07-302588 A | 11/1995 |
| JP | H07302588 | * 11/1995 |
| JP | H08-259213 A | 10/1996 |
| JP | 2007-213953 A | 8/2007 |
| KR | 10-2000-0042129 A | 7/2000 |
| KR | 10-2007-0046066 A | 5/2007 |
| KR | 10-2013-0050704 A | 5/2013 |
| KR | 10-2014-0114786 A | 9/2014 |
| KR | 10-2015-0112746 A | 10/2015 |
| KR | 10-2018-0002715 A | 1/2018 |
| KR | 10-1855848 B1 | 5/2018 |

OTHER PUBLICATIONS

JPH07302588MT (Year: 1995).*
Decision to Grant a Patent published by KPO (Year: 2021).*
Extended European Search Report issued by the European Patent Office dated Jun. 29, 2021 in corresponding European patent application No. 19872853.7.

(Continued)

*Primary Examiner* — Alexander Usyatinsky
(74) *Attorney, Agent, or Firm* — Bryan Cave Leighton Paisner LLP

(57) ABSTRACT

According to an exemplary embodiment of the present disclosure, a negative electrode active material includes metal-silicon-carbon based particles including a $M_aSi_bC$ matrix, wherein M in the $M_aSi_bC$ matrix is one or more selected from the group consisting of Li, Mg, Na, Ca, and Al, $0.35 \le a \le 1$, and $1 \le b \le 2$. Since at the time of charging and discharging a battery, formation of an irreversible phase may be minimized by the $M_aSi_bC$ matrix, initial efficiency of the battery may be improved, and electrical conductivity, physical strength, and chemical stability may be improved, such that capacity and lifecycle characteristics of the battery may be improved.

11 Claims, No Drawings

(56) References Cited

OTHER PUBLICATIONS

Liu et al., "Solutions for the problems of silicon-carbon anode materials for lithium-ion batteries", Royal Society Open Science, 5(6), 172370 (2018).
International Search Report (with partial translation) and Written Opinion dated Jan. 23, 2020, issued in corresponding International Patent Application No. PCT/KR2019/013775.

* cited by examiner

NEGATIVE ELECTRODE ACTIVE MATERIAL, NEGATIVE ELECTRODE INCLUDING THE NEGATIVE ELECTRODE ACTIVE MATERIAL, SECONDARY BATTERY INCLUDING THE NEGATIVE ELECTRODE, AND METHOD OF PREPARING THE NEGATIVE ELECTRODE ACTIVE MATERIAL

CROSS-REFERENCE TO RELATED APPLICATION

This application claims priority to and the benefit of Korean Patent Application No. 10-2018-0124980, filed on Oct. 19, 2018, the disclosure of which is incorporated herein by reference in its entirety.

TECHNICAL FIELD

The present disclosure relates to a negative electrode active material, a negative electrode including the negative electrode active material, a secondary battery including the negative electrode, and a method of preparing the negative active electrode material, and more particularly, to a negative electrode active material including a $SiC_x$ matrix; and silicon-carbon based particles containing a metal doped on the $SiC_x$ matrix.

BACKGROUND ART

Due to rapid increase in use of fossil fuel, the demand for use of alternative energy or clean energy has been increased. As a part of this, the most actively researched fields are power generation and electricity storage fields using electrochemical reactions.

Currently, as a representative example of an electrochemical device using electrochemical energy as described above is a secondary battery, and a use area of the secondary battery is gradually increasing. Currently, as the technical development and demand for portable apparatus such as a portable computer, a portable phone, a camera, and the like have been increased, the demand for the secondary battery as an energy source has been rapidly increased. Among these secondary batteries, a lithium secondary battery having a high energy density, that is, a high capacity lithium secondary battery has been studied a lot and commercialized to thereby be widely used.

Generally, the secondary battery is composed of a positive electrode, a negative electrode, an electrolyte, and a separator. The negative electrode includes a negative electrode active material intercalating and deintercalating lithium ions from the positive electrode, and as the negative electrode active material, silicon based particles having a high discharge capacity may be used. However, $SiO_2$ of the silicon based particles such as $SiO_x$ (0≤x<2) reacts with Li ions generated from the positive electrode at the time of charging the secondary battery to form lithium silicate, which is an irreversible phase. Therefore, initial efficiency of the battery is low. Further, since the silicon based particles such as $SiO_x$ (0≤x<2) have excessive volume change during charging and discharging processes and low electrical conductivity, there is a problem in that a lifecycle of the battery is decreased.

In the related art, in order to solve these problems, technologies of forming a coating layer on surfaces of silicon based particles have been used. In detail, there is a method of forming a carbon coating layer on surfaces of silicon based particles (Korean Patent Laid-Open Publication No. 10-2015-0112746). However, even in the case of forming the carbon coating layer, it is difficult to control formation of an irreversible phase, and an effect of decreasing battery resistance is not large.

Therefore, a negative electrode active material capable of improving initial efficiency, capacity, and lifecycle characteristics of a battery while replacing $SiO_x$ (0≤x<2) has been required.

RELATED ART DOCUMENT

Patent Document

Korean Patent Laid-Open Publication No. 10-2015-0112746

DISCLOSURE

Technical Problem

An aspect of the present disclosure provides a negative electrode active material capable of suppressing irreversible reactions in battery reactions to improve initial efficiency and improving capacity and lifecycle characteristics of a battery due to excellent electrical conductivity, mechanical strength, and chemical stability.

Another aspect of the present disclosure provides a method of preparing the negative electrode active material.

Another aspect of the present disclosure provides a negative electrode including the negative electrode active material, and a secondary battery including the negative electrode.

Technical Solution

According to an exemplary embodiment of the present disclosure, a negative electrode active material includes metal-silicon-carbon based particles including a $M_aSi_bC$ matrix, wherein M in the $M_aSi_bC$ matrix is one or more selected from the group consisting of Li, Mg, Na, Ca, and Al, 0.3≤a≤1, and 1≤b≤2.

According to another exemplary embodiment of the present disclosure, a method of preparing the negative electrode active material described above includes forming a matrix fluid through thermal treatment by introducing a vaporized silicon source, a carbon source, a metal source, and a carrier gas into a furnace, wherein in the forming of the matrix fluid, a ratio of a flow rate of the vaporized silicon source, a flow rate of the carbon source, and a flow rate of a metal source is 1:0.2:0.2 to 1:0.8:0.8.

According to another exemplary embodiment of the present disclosure, a negative electrode includes the negative electrode active material, and a secondary battery includes the negative electrode.

Advantageous Effects

With the negative electrode active material, since at the time of charging and discharging the battery, formation of the irreversible phase may be minimized by the $M_aSi_bC$ matrix, initial efficiency of the battery may be improved, and capacity and lifecycle characteristics of the battery may be improved due to improved electrical conductivity, physical strength, and chemical stability. In addition, since the doping metal is included in the $M_aSi_bC$ matrix, electrical conductivity may be further improved, such that capacity and lifecycle characteristics of the battery may be further improved.

MODE OF THE INVENTION

Hereinafter, the present disclosure will be described in more detail, in order to assist in the understanding of the present disclosure.

Terms and words used in the present specification and claims are not to be construed as a general or dictionary meaning but are to be construed as meaning and concepts meeting the technical ideas of the present disclosure based on a principle that the inventors can appropriately define the concepts of terms in order to describe their own disclosures in best mode.

Terms used in the present specification are used only in order to describe exemplary embodiments rather than limiting the present disclosure. Singular forms are intended to include plural forms unless the context clearly indicates otherwise.

It is to be understood that terms "include", "comprise", "have", or the like, used in the present specification specify the presence of features, numerals, steps, components, or a combination thereof stated in the present specification, but do not preclude the presence or addition of one or more other features, numerals, steps, components, or a combination thereof.

A negative electrode active material according to the present disclosure includes metal-silicon-carbon based particles including a $M_aSi_bC$ matrix, wherein M in the $M_aSi_bC$ matrix is one or more selected from the group consisting of Li, Mg, Na, Ca, and Al, $0.3 \leq a \leq 1$, and $1 \leq b \leq 2$. In the $M_aSi_bC$ matrix, Si is silicon, and C is carbon.

The $M_aSi_bC$ matrix may have a structure in which three phases of SiC, Si, and $M_aSi_bC$ coexist.

In $SiO_x$ ($0 \leq x < 2$) particles, which are silicon based particles generally used as a negative electrode active material, at the time of driving a battery, an irreversible phase is formed by $SiO_2$ included in $SiO_x$ ($0 \leq x < 2$). Therefore, initial efficiency of the battery is low. Further, since physical strength and chemical stability of $SiO_x$ ($0 \leq x < 2$) are low, a volume of a negative electrode is excessively changed during charging and discharging the battery, and electrical conductivity of $SiO_x$ ($0 \leq x < 2$) is low. Therefore, in the case of a battery using $SiO_x$ ($0 \leq x < 2$), there is a problem in that capacity and a lifecycle are decreased.

On the contrary, since the SiC matrix does not include $SiO_2$, formation of the irreversible phase may be minimized, such that at the time of using a negative electrode active material including the SiC matrix, initial efficiency of a battery may be improved. In addition, the SiC matrix has excellent physical strength and chemical stability, such that at the time of charging and discharging, a volume expansion degree of the battery is small as compared to $SiO_x$ ($0 \leq x < 2$).

Further, the $M_aSi_bC$ matrix has excellent electrical conductivity as compared to $SiO_x$ ($0 \leq x < 2$), such that at the time of using the negative electrode active material including the $M_aSi_bC$ matrix, capacity and lifecycle characteristics of the battery may be improved.

In the $M_aSi_bC$ matrix, a corresponds to a "number ratio" of M to C included in the $M_aSi_bC$ matrix, and b corresponds to a number ratio of Si to C. In the $M_aSi_bC$ matrix, a may be 0.3 or more to 1 or less, specifically, 0.5 or more to 1 or less, and b may be 1 or more to 2 or less, specifically, 1.2 or more to 2 or less.

In the case in which a is lower than the above-mentioned range, a content of M low, such that electrical conductivity may be decreased, and in the case in which b is higher than the above-mentioned range, a content of Si is relatively increased, such that side reactions with an electrolyte may be generated by Si that does not maintain a bonding relationship with carbon or a metal, and at the time of charging and discharging the battery, a volume of an electrode may be excessively increased by Si described above. Further, in the case in which a is excessively higher than the above-mentioned range or b is lower than the above-mentioned range, a content of Si is excessively low, such that capacity of the battery may be excessively decreased, and as a ratio of M in the matrix is increased, an amount of formed metal silicide is excessive, thereby causing instability of the active material, deterioration of lifecycle characteristics, or the like. In consideration of the ranges of a and b, the $M_aSi_bC$ matrix of the negative electrode active material according to the present disclosure is distinguished from general SiC (silicon carbide). In the case of SiC, the number ratio of Si and C is 1:1, but in the $M_aSi_bC$ matrix, the number of Si is larger than that of C, and electrical conductivity may be improved by a $M_aSi_bC$ phase. Therefore, in the case of using the $M_aSi_bC$ matrix instead of SiC that is chemically stable, capacity and lifecycle characteristics may be improved.

M in the $M_aSi_bC$ matrix is one or more selected from the group consisting of Li, Mg, Na, Ca, and Al, and preferably, M is Mg in view of reaction stability and improving an effect of preventing side reactions with an electrolyte.

The $M_aSi_bC$ matrix may include 10 wt % to 35 wt % of M, 45 wt % to 75 wt % of Si, and 15 wt % to 25 wt % of C, preferably, 12 wt % to 25 wt % of M, 52 wt % to 70 wt % of Si, and 15 wt % to 25 wt % of C, and more preferably, 17 wt % to 20 wt % of M, 60 wt % to 65 wt % of Si, and 17 wt % to 23 wt % of C. Within the above-mentioned range, effects of the negative electrode active material to improve electrical conductivity and lifecycle characteristics may be preferably improved, and capacity of the battery may be improved by Si.

In the $M_aSi_bC$ matrix, a weight ratio of Si to M may be 1.5 to 7, preferably 2 to 5.5, and more preferably, 3 to 4.2. The weight ratio is within the above-mentioned range, which is preferable in that capacity by Si may be excellently expressed, and initial efficiency and lifecycle characteristics may be simultaneously improved.

The $M_aSi_bC$ matrix may be in form of particles.

In this case, the $M_aSi_bC$ matrix may include Si, SiC, and $M_xSi_yC$, wherein M is Li, Mg, Na, Ca, or Al, $1 < x \leq 3$, and $0.5 < y \leq 2$. In detail, $1 < x \leq 2$, and $1 < y \leq 2$.

Contents of Si, C, and M may be confirmed by an ICP method.

An average particle size ($D_{50}$) of the metal-silicon-carbon based particles may be 1 μm to 10 μm, specifically, 1 μm to 7 μm, and more specifically, 1 μm to 6 μm. When the average particle size is within the above-mentioned range, spreading resistance of an electrolyte may be decreased. In the present specification, the average particle size ($D_{50}$) may be defined as a particle size corresponding to a cumulative volume of 50% in a particle size distribution curve of particles. The average particle size ($D_{50}$) may be measured, for example, using a laser diffraction method. In the laser diffraction method, generally, an average particle size in a range of about submicron to several mm may be measured, and results with high reproducibility and high resolvability may be obtained.

A negative electrode according to another exemplary embodiment of the present disclosure may include a negative electrode active material, wherein the negative electrode active material may be the same as the negative electrode active material according to the exemplary embodiment of the present disclosure described above. In detail, the negative electrode may include a current collector and a negative electrode active material layer disposed on the current collector. The negative electrode active material layer may include the negative electrode active material. Further, the negative electrode active material layer may further include a binder and/or a conductive material.

The current collector is not particularly limited as long as it does not cause chemical changes in the corresponding battery and has conductivity. For example, as the current collector, cupper, stainless steel, aluminum, nickel, titanium, baked carbon, aluminum or stainless steel surface-treated with carbon, nickel, titanium, or silver, or the like, may be used. In detail, a transition metal that adsorbs carbon well such as copper or nickel may be used as the current collector. A thickness of the current collector may be 6 μm to 20 μm, but is not limited thereto.

The negative electrode active material may be included in the negative electrode active material layer in a content of 80 wt % to 99.9 wt %, preferably 93 wt % to 98 wt %. When the content of the negative electrode active material is within the above-mentioned range, initial efficiency of the battery may be improved, and electrical conductivity, physical strength, and chemical stability may be improved, such that capacity and lifecycle characteristics of the battery may be preferably improved.

The negative electrode active material may further include a graphite based active material in addition to the above-mentioned metal-silicon-carbon based particles. Charge and discharge characteristics of the battery may be improved by using the graphite based active material together with the metal-silicon-carbon based particles.

The graphite based active material may be one or more selected from the group consisting of graphite such as artificial graphite or natural graphite, graphitized carbon fiber, and graphitized mesocarbon microbeads.

In the case in which the negative electrode active material further includes the metal-silicon-carbon based particles and the graphite based active material, the negative electrode active material may include the metal-silicon-carbon based particles and the graphite based active material in a weight ratio of 1:99 to 30:70, preferably, 3:97 to 20:80. Within the above-mentioned range, improvement of electrical conductivity and lifecycle characteristics of the metal-silicon-carbon based particles and charge and discharge characteristics of the graphite based active material may be simultaneously and excellently exhibited.

The binder may include at least one selected from the group consisting of a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinyl pyrrolidone, polytetrafluoroethylene, polyethylene, polypropylene, an ethylene-propylene-diene monomer (EPDM), sulfonated-EPDM, styrene butadiene rubber (SBR), fluorine rubber, polyacrylic acid, and materials in which hydrogen of the above-mentioned material is substituted with Li, Na, Ca, or the like, and may include various copolymers thereof.

The binder may be included in the negative electrode active material layer in a content of 0.1 wt % to 10 wt %, more preferably 0.5 wt % to 5 wt %.

The conductive material is not particularly limited as long as it does not cause chemical changes in the battery and has conductivity. For example, graphite such as natural graphite or artificial graphite; carbon black such as carbon black, acetylene black, ketjen black, channel black, furnace black, lamp black, or thermal black; conductive fibers such as carbon fibers and metallic fibers; conductive tubes such as carbon nanotubes; metal powders such as fluorocarbon powder, aluminum powder, and nickel powder; conductive whiskers such as zinc oxide, potassium titanate, and the like; conductive metal oxides such as titanium oxide; conductive materials such as polyphenylene derivatives; and the like may be used as the conductive material.

The conductive material may be included in the negative electrode active material layer in a content of 0.1 wt % to 10 wt %, more preferably 0.5 wt % to 5 wt %.

A secondary battery according to another exemplary embodiment of the present disclosure may include a negative electrode, a positive electrode, a separator interposed between the positive electrode and the negative electrode, and an electrolyte, wherein the negative electrode is the same as the negative electrode described above. Since the negative electrode is described in detail, a detailed description thereof will be omitted.

The positive electrode may include a positive electrode current collector and a positive electrode active material layer formed on the positive electrode current collector and including a positive electrode active material.

In the positive electrode, the positive electrode current collector is not particularly limited as long as it does not cause chemical changes in the battery and has conductivity. For example, stainless steel, aluminum, nickel, titanium, baked carbon, aluminum or stainless steel surface-treated with carbon, nickel, titanium, or silver, or the like, may be used. Further, the positive electrode current collector may generally have a thickness of 3 to 500 μm, and adhesion force of the positive electrode active material may be increased by forming fine unevenness on a surface of the current collector. For example, the positive electrode current collector may be used in various forms including films, sheets, foils, nets, porous structures, foams, non-woven fabrics, and the like.

The positive electrode active material may be a generally used positive electrode active material. Specifically, the positive electrode active material may include layered compounds such as lithium cobalt oxide ($LiCoO_2$) or lithium nickel oxide ($LiNiO_2$) or compound substituted with one or more transition metals; lithium iron oxides such as $LiFe_3O_4$; lithium manganese oxide represented by Chemical Formula $Li_{1+c1}Mn_{2-c1}O_4$ ($0 \leq c1 \leq 0.33$), $LiMnO_3$, $LiMn_2O_3$, or $LiMnO_2$; lithium copper oxide ($Li_2CuO_2$); vanadium oxide such as $LiV_3O_8$, $V_2O_5$, or $Cu_2V_2O_7$; Ni-site type lithium nickel oxide represented by Chemical Formula $LiNi_{1-c2}M_{c2}O_2$ (here, M is at least one selected from the group consisting of Co, Mn, Al, Cu, Fe, Mg, B, and Ga, and $0.01 \leq c2 \leq 0.3$); lithium manganese composite oxide represented by Chemical Formula $LiMn_{2-c3}M_{c3}O_2$ (here, M is at least one selected from the group consisting of Co, Ni, Fe, Cr, Zn, and Ta, and $0.01 \leq c3 \leq 0.1$) or $Li_2Mn_3MO_8$ (here, M is at least one selected from the group consisting of Fe, Co, Ni, Cu, and Zn); $LiMn_2O_4$ in which some of Li atoms are substituted with alkaline earth metal ions, but is not limited thereto. The positive electrode may be a lithium metal.

The positive electrode active material layer may further include a positive electrode conductive material and a positive electrode binder in addition to the above-mentioned positive electrode active material.

Here, the positive electrode conductive material is used to impart conductivity to an electrode and is not particularly limited as long as it does not cause chemical changes in the manufactured battery and has electron conductivity. Specific example thereof may include graphite such as natural graphite or artificial graphite; carbon based material such as carbon black, acetylene black, ketjen black, channel black, furnace black, lamp black, thermal black, or carbon fiber; metal powders or metal fibers made of copper, nickel, aluminum, silver, or the like; conductive whiskers such as zinc oxide, potassium titanate, or the like; conductive metal oxides such as titanium oxide, or the like; a conductive polymer such as polyphenylene derivatives, and the like. One of them may be used alone or a mixture of two or more thereof may be used.

The positive electrode binder serves to improve adhesion between positive electrode active material particles and adhesion force between the positive electrode active material and the positive electrode current collector. Specific examples thereof may include polyvinylidene fluoride (PVDF), a vinylidenefluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinyl pyrrolidone, polytetrafluoroethylene, polyethylene, polypropylene, an ethylene-propylene-diene monomer (EPDM), sulfonated-EPDM, styrene butadiene rubber (SBR), fluorine rubber, and various copolymers thereof. One of them may be used alone or a mixture of two or more thereof may be used.

The separator, which separates the negative electrode and the positive electrode from each other and provides a movement path of lithium ions, is not particularly limited as long as it is used as a separator in a general secondary battery. Particularly, a separator having low resistance with respect to movement of ions of the electrolyte and having an excellent "electrolyte-wetting ability" is preferably used. Specifically, a porous polymer film, for example, a porous polymer film made of a polyolefine based polymer such as an ethylene homopolymer, a propylene homopolymer, an ethylene/butene copolymer, an ethylene/hexene copolymer, and an ethylene/methacrylate copolymer, or at least two layer laminates thereof may be used. In addition, general porous non-woven fabric, for example, non-woven fabric made of glass fiber having a high melting point, polyethylene terephthalate fiber, or the like, may be used. Further, in order to secure heat resistance or mechanical strength, a coated separator including a ceramic component or a polymer material may also be used, and a monolayer or multilayer structure may be selectively used.

Examples of the electrolyte may include organic liquid electrolytes, inorganic liquid electrolytes, solid polymer electrolytes, gel type polymer electrolytes, solid inorganic electrolyte, a molten type inorganic electrolytes, and the like, which may be used at the time of manufacturing a lithium secondary battery, but the electrolyte is not limited thereto.

Specifically, the electrolyte may include a non-aqueous organic solvent and a metal salt.

As the non-aqueous organic solvent, non-aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate may be used.

Since among the carbonate based organic solvents, particularly, ethylene carbonate and propylene carbonate corresponding to cyclic carbonates, which are high-viscosity organic solvents, have high permittivity to dissociate lithium salts well, ethylene carbonate and propylene carbonate may be preferably used. In the case of using a mixture of the cyclic carbonate and a low-viscosity and low-permittivity linear carbonate such as dimethyl carbonate and diethyl carbonate at a suitable ratio, it is possible to prepare an electrolyte having high electrical conductivity, such that the electrolyte may be more preferably used.

As the metal salt, a lithium salt may be used, and the lithium salt is a material suitable for being dissolved in the non-aqueous electrolyte. As an anion of the lithium salt, for example, one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used.

In order to improve lifecycle characteristics of the battery, suppress a decrease in capacity of the battery, improve discharge capacity of the battery, and the like, the electrolyte may further includes one or more additives, for example, a haloalkylene carbonate based compounds such as difluoroethylene carbonate, pyridine, triethyl phosphate, triethanolamine, cyclic ether, ethylene diamine, n-glyme, hexaphosphoric triamide, a nitrobenzene derivative, sulfur, a quinone imine dye, N-substituted oxazolidinone, N, N-substituted imidazolidine, ethylene glycol dialkyl ether, ammonium salt, pyrrole, 2-methoxy ethanol, or aluminum trichloride in addition to the above-mentioned components constituting the electrolyte.

According to another exemplary embodiment of the present disclosure, there are provided a battery module including the secondary battery as a unit cell, and a battery pack including the battery module. Since the battery module and the battery pack include the secondary battery having high capacity, high rate performance, and cycle characteristics, the battery module and the battery pack may be used as a power source of a medium-large device selected from the group consisting of an electric vehicle, a hybrid electric vehicle, a plug-in hybrid electric vehicle, and a power storage system.

A method of preparing a negative electrode active material according to another exemplary embodiment of the present disclosure includes forming a metal-doped $M_aSi_bC$ matrix fluid through thermal treatment by introducing a vaporized silicon source, a carbon source, a metal source, and a carrier gas into a reaction furnace.

In the forming of the matrix fluid, the vaporized silicon source may be obtained by thermally treating a silicon source at a high temperature to vaporize the silicon source. Here, the silicon source may be at least one selected from the group consisting of pure silicon (Si), silane, and trichloro silane. The carbon source may be in a gas state. The carbon source may be at least one selected from the group consisting of methane, ethylene, acetylene, and methylene. The metal source may be one or more selected from the group consisting of Li, Mg, Ca, Na, and Al. Specifically, the silicon source may be silicon, the carbon source may be methane, and the metal source may be Mg. In this case, high purity Si, C, and Mg may be fed into the reaction furnace.

The carrier gas may be an inert gas. Specifically, the carrier gas may be at least one selected from the group consisting of Ar, He, and Ne, and more specifically, the carrier gas may be Ar. The matrix fluid formed by the carrier gas may be discharged from the reaction furnace.

A flow rate of the vaporized silicon source may be 100 sccm to 300 sccm, specifically, 100 sccm to 250 sccm, and more specifically, 150 sccm to 220 sccm. A flow rate of the carbon source may be 30 sccm to 180 sccm, specifically, 30 sccm to 120 sccm. A flow rate of the metal source may be 30 sccm to 180 sccm, specifically, 30 sccm to 150 sccm, and more specifically, 80 sccm to 120 sccm. A flow rate of the carrier gas may be 550 sccm to 3,000 sccm, specifically, 1,000 sccm to 3,000 sccm.

A ratio of the flow rate of the vaporized silicon source, the flow rate of the carbon source, and the flow rate of the metal source may be 1:0.2:0.2 to 1:0.8:0.8, preferably, 1:0.3:0.3 to 1:0.6:0.6, and more preferably, 1:0.4:0.4 to 1:0.55:0.55. Since within the above-mentioned range, a $M_aSi_bC$ matrix in which a is 0.3 or more to 1 or less and b is 1 or more to 2 or less may be formed, electrical conductivity of the negative electrode active material and capacity of a secondary battery may be improved.

Thermal treatment may be performed at 1,000° C. to 2,500° C., specifically, 1,800° C. to 2,300° C., and more specifically, 1,900° C. to 2,200° C. Within the above-mentioned range, the carbon source may be stably decomposed, such that carbon may be smoothly provided.

Hereinafter, Examples will be provided in order to assist in the understanding of the present disclosure. However, it will be obvious to those skilled in the art that the following Examples are only examples of the present disclosure and various modifications and alterations may be made without departing from the scope and spirit of the present disclosure. In addition, these modifications and alterations will fall within the following claims.

EXAMPLE

Example 1

(1) Preparation of Silicon-Carbon Based Particles
1) Formation of Matrix Fluid

Pure silicon was used as a silicon source, methane gas was used as a carbon source, a Mg metal was used as a metal source, and Ar was used as a carrier gas. While silicon was vaporized and introduced into a tube type furnace, a temperature of the furnace was maintained at 2,000° C. to perform thermal treatment in a section of 80 cm. Here, a flow rate of the vaporized silicon was 200 sccm, a flow rate of the methane gas was 100 sccm, a flow rate of Mg gas was 100 sccm, and a flow rate of the Ar gas was 1,500 sccm. In this way, $Mg_{0.52}Si_{1.51}C$ was formed. Here, an atomic ratio of Mg and Si was measured by ICP. Further, an average particle size ($D_{50}$) of silicon-carbon based particles confirmed by a laser diffraction method was 5 μm.

(2) Manufacture of Negative Electrode

The prepared metal-silicon-carbon based active material particles, graphite, carbon black corresponding to a conductive material, carboxylmethyl cellulose (CMC) corresponding to a binder, and styrene butadiene rubber (SBR) were mixed at a weight ratio of 4.8:91:1:1.7:1.5 to prepare 5 g of a mixture. Negative electrode slurry was prepared by adding 28.9 g of distilled water to the mixture.

The negative electrode slurry was applied and dried on a copper (Cu) metal thin film having a thickness of 20 μm, corresponding to a negative electrode current collector. Here, a temperature of circulated air was 60° C. Subsequently, the resultant was roll-pressed, dried in a vacuum oven at 130° C. for 12 hours, and then, punched in a circular form of 1.4875 cm² to manufacture a negative electrode.

(3) Manufacture of Secondary Battery

The prepared negative electrode was used, and a lithium (Li) metal thin film cut in a circular form of 1.7671 cm² was used as a positive electrode. A porous polyethylene separator was interposed between the positive electrode and the negative electrode, an electrolyte obtained by dissolving 0.5 wt % of vinylene carbonate in a mixed solution in which methyl ethyl carbonate (MEC) and ethylene carbonate (EC) was mixed at a mixing ratio of 7:3 and dissolving 1M $LiPF_6$ was injected, thereby manufacturing a lithium coin half-cell.

Example 2

Metal-silicon-carbon based active material particles in Example 2 were prepared by the same method as in Example 1 except that the flow rate of the vaporized silicon was adjusted to 200 sccm, the flow rate of the methane gas was adjusted to 100 sccm, a flow rate of the Mg gas was adjusted to 70 sccm, and the flow rate of the Ar gas was adjusted to 1,500 sccm. In this way, $Mg_{0.35}Si_{1.53}C$ was formed. Here, an atomic ratio of Mg and Si was measured by ICP. Further, an average particle size ($D_{50}$) of silicon-carbon based particles confirmed by a laser diffraction method was 5 μm.

Example 3

Metal-silicon-carbon based active material particles in Example 3 were prepared by the same method as in Example 1 except that the flow rate of the vaporized silicon was adjusted to 145 sccm, the flow rate of the methane gas was adjusted to 100 sccm, a flow rate of the Mg gas was adjusted to 100 sccm, and the flow rate of the Ar gas was adjusted to 1,500 sccm. In this way, $Mg_{0.54}Si_{1.08}C$ was formed. Here, an atomic ratio of Mg and Si was measured by ICP. Further, an average particle size ($D_{50}$) of silicon-carbon based particles confirmed by a laser diffraction method was 5 μm.

Comparative Example 1

Silicon-carbon based particles, a negative electrode, and a secondary battery were manufactured by the same methods as in Example 1 except that a metal source gas was not introduced.

Comparative Example 2

(1) Preparation of Silicon-Oxygen Based Particles
Metal-silicon-oxygen based particles in Comparative Example 2 were prepared by the same method as in Example 1 except that $SiO_2$ was used instead of the methane gas in Example 1.

Here, a content ratio of the metal, silicon, and oxygen confirmed by ICP was 15:9:36 based on a total weight of the particle. Further, an average particle size ($D_{50}$) of silicon-oxygen based particles confirmed by a laser diffraction method was 5 μm.

(2) Manufacture of Negative Electrode and Secondary Battery

A negative electrode and a secondary battery were manufacture by the same method as in Example 1 except that the prepared silicon-oxygen based particles were used.

Comparative Example 3

Metal-silicon-carbon based active material particles in Comparative Example 3 were prepared by the same method as in Example 1 except that the flow rate of the vaporized silicon was adjusted to 40 sccm, the flow rate of the methane gas was adjusted to 200 sccm, a flow rate of the Mg gas was adjusted to 100 sccm, and the flow rate of the Ar gas was adjusted to 1,500 sccm. In this way, $Mg_{0.22}Si_{1.56}C$ was formed. Here, an atomic ratio of Mg and Si was measured by ICP. Further, an average particle size ($D_{50}$) of silicon-carbon based particles confirmed by a laser diffraction method was 5 μm.

Comparative Example 4

Metal-silicon-carbon based active material particles in Comparative Example 4 were prepared by the same method as in Example 1 except that the flow rate of the vaporized silicon was 200 sccm, a flow rate of the methane gas was 200 sccm, a flow rate of Mg gas was 200 sccm, and a flow rate of the Ar gas was 1,500 sccm. In this way, $Mg_{0.52}Si_{0.82}C$ was formed. Here, an atomic ratio of Mg and Si was measured by ICP. Further, an average particle size ($D_{50}$) of silicon-carbon based particles confirmed by a laser diffraction method was 5 μm.

Comparative Example 5

Metal-silicon-carbon based active material particles in Comparative Example 5 were prepared by the same method as in Example 1 except that the flow rate of the vaporized silicon was 300 sccm, a flow rate of the methane gas was 100 sccm, a flow rate of Mg gas was 100 sccm, and a flow rate of the Ar gas was 1,500 sccm. In this way, $Mg_{0.53}Si_{2.12}C$ was formed. Here, an atomic ratio of Mg and Si was measured by ICP. Further, an average particle size ($D_{50}$) of silicon-carbon based particles confirmed by a laser diffraction method was 5 μm.

Experimental Example 1 Evaluation of Discharge Capacity, Initial Efficiency, Capacity Retention Rate, and Electrode Thickness Change Rate Charging and discharging were performed on the batteries in Examples 1 to 3 and Comparative Examples 1 to 5 to evaluate discharge capacity, initial efficiency, a capacity retention rate, and an electrode (negative electrode) thickness change rate. The results were described in the following Table 1.

Meanwhile, the charging and discharging were performed at 0.1 C in first and second cycles, and performed at 0.5 C from third up to 49th cycles. The 50th cycle was terminated in a charging state (in a state in which lithium was in the negative electrode), and after decomposing the battery to measure a thickness, an electrode thickness change rate was calculated.

Charge condition: CC (constant current)/CV (constant voltage (5 mV/0.005 C current cut-off)
Discharge condition: CC (constant current) condition, 1.5 V Charge capacity (mAh/g) and initial efficiency (%) were derived through results at the time of one-time charge and discharge. Specifically, the initial efficiency (%) was derived by the following calculation.

Initial efficiency (%)=(discharge capacity after one-time discharge/one-time charge capacity)×100

A capacity retention rate and an electrode thickness change rate were derived by the following Calculations, respectively.

Capacity retention rate (%)=(discharge capacity at $49^{th}$ cycle/discharge capacity at first cycle)×100

Electrode thickness change rate (%)=(final negative electrode thickness change amount/initial negative electrode thickness)×100

TABLE 1

| Battery | a value of $M_aSi_bC$ or $M_aSi_bO_2$ | b value of $M_aSi_bC$ or $M_aSi_bO_2$ | Discharge capacity (mAh/g) | Initial efficiency (%) | Capacity retention rate (%) | Electrode thickness change rate (%) |
|---|---|---|---|---|---|---|
| Example 1 | 0.52 | 1.51 | 410 | 91.8 | 88.1 | 36.5 |
| Example 2 | 0.35 | 1.53 | 412 | 90.9 | 86.2 | 38.2 |
| Example 3 | 0.54 | 1.08 | 401 | 91.2 | 86.5 | 37.9 |
| Comparative Example 1 | 0 | 1.56 | 405 | 90.8 | 79.0 | 44.6 |
| Comparative Example 2 | 0.55 | 1.52 | 395 | 87.9 | 70.5 | 52.8 |
| Comparative Example 3 | 0.22 | 1.56 | 400 | 90.2 | 80.4 | 37.2 |
| Comparative Example 4 | 0.52 | 0.82 | 382 | 90.9 | 83.2 | 45.9 |
| Comparative Example 5 | 0.53 | 2.12 | 420 | 90.0 | 71.2 | 65.1 |

Referring to Table 1, it may be appreciated that in Examples 1 to 3, discharge capacity, initial efficiency, and the capacity retention rate were simultaneously improved to significantly excellent levels, and the electrode thickness change rate was low.

However, it may be appreciated that in Comparative Example 1 in which a metal was not introduced into a matrix, since electrical conductivity was decreased, initial efficiency and the capacity retention rate were decreased, and the electrode thickness change rate was high.

Further, it may be appreciated that in Comparative Example 2, due to a $SiO_2$ phase forming an irreversible phase, initial efficiency and the capacity retention rate were decreased, and the electrode thickness change rate was significantly high.

Further, it may be confirmed that in Comparative Examples 3 to 5 in which contents of a metal, silicon, and carbon contained in the metal-silicon-carbon based particles were not suitable, initial efficiency and the capacity retention rate were low, and the electrode thickness change rate was significantly high. Specifically, in Comparative Example 3, a doping content of the metal was low, such that initial efficiency was low, and the capacity retention rate was low due to side reactions with an electrolyte, and in Comparative Example 4, the content of Si was low, such that the capacity of the battery was excessively decreased, and since a ratio of M in the matrix was excessive, which caused instability of the active material, in view of the capacity retention rate and the electrode thickness change rate, undesirable effects were obtained. Further, it may be appreciated that in Comparative Example 5, the content of Si in the matrix was excessively high, initial efficiency was low, and side reactions of the electrolyte by Si were intensified, such that the capacity retention rate was low, and the electrode thickness change rate was high.

The invention claimed is:
1. A negative electrode active material comprising metal-silicon-carbon based particles including a $M_aSi_bC$ matrix, wherein M in the $M_aSi_bC$ matrix is one or more selected from the group consisting of Li, Mg, Na, Ca, and Al, 0.3≤a≤1, and 1≤b≤2,
wherein the matrix has a structure in which three phases of SiC, Si and $M_aSi_bC$ coexist.

2. The negative electrode active material according to claim 1, wherein an average particle size ($D_{50}$) of the metal-silicon-carbon based particles is 1 μm to 10 μm.

3. The negative electrode active material according to claim 1, wherein the $M_aSi_bC$ matrix includes Si, SiC, and $M_xSi_yC$, M in $M_xSi_yC$ being one or more selected from the group consisting of Li, Mg, Na, Ca, and Al, $1<x\leq3$, and $0.5<y\leq2$.

4. The negative electrode active material according to claim 1, wherein the $M_aSi_bC$ matrix includes 10 wt % to 35 wt % of M, 45 wt % to 75 wt % of Si, and 15 wt % to 25 wt % of C based on a total weight of $M_aSi_bC$ matrix.

5. The negative electrode active material according to claim 1, wherein in the $M_aSi_bC$ matrix, a weight ratio of Si to M is 1.5 to 7.

6. A method of preparing the negative electrode active material according to claim 1, the method comprising forming a matrix fluid through thermal treatment by introducing a vaporized silicon source, a carbon source, a metal source, and a carrier gas into a reaction furnace, wherein in the forming of the matrix fluid, a ratio of a flow rate of the vaporized silicon source, a flow rate of the carbon source, and a flow rate of the metal source is 1:0.2:0.2 to 1:0.8:0.8.

7. The method according to claim 6, wherein the thermal treatment is performed at 1,000° C. to 2,500° C.

8. The method according to claim 6, wherein the carrier gas is one or more selected from the group consisting of Ar, He, and Ne.

9. A negative electrode comprising the negative electrode active material of claim 1.

10. The negative electrode according to claim 9, further comprising a graphite based active material.

11. A secondary battery comprising:
the negative electrode of claim 9;
a positive electrode;
a separator interposed between the positive electrode and the negative electrode; and
and an electrolyte.

* * * * *